March 12, 1935. B. E. GAVIN 1,993,927
PIPE CLAMP
Filed Nov. 27, 1931 2 Sheets-Sheet 1

INVENTOR-
Beauford E. Gavin
BY
Clarence D. Kerr
his ATTORNEY-

March 12, 1935.  B. E. GAVIN  1,993,927
PIPE CLAMP
Filed Nov. 27, 1931  2 Sheets-Sheet 2
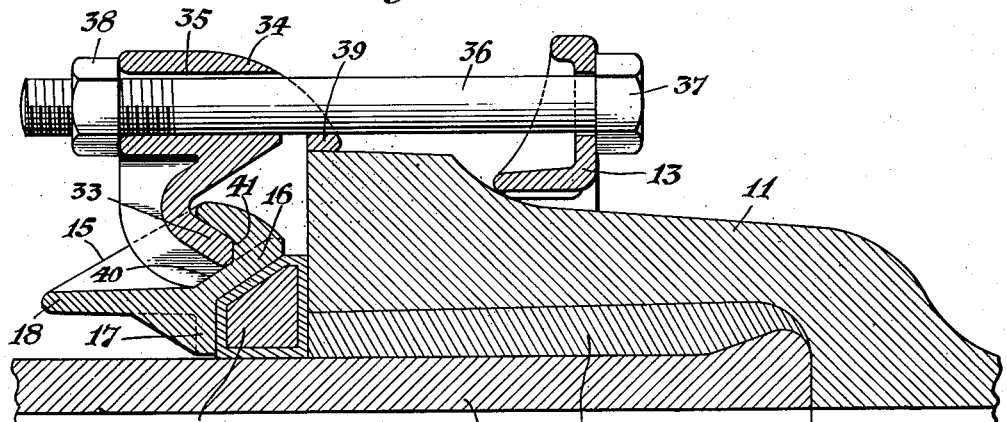
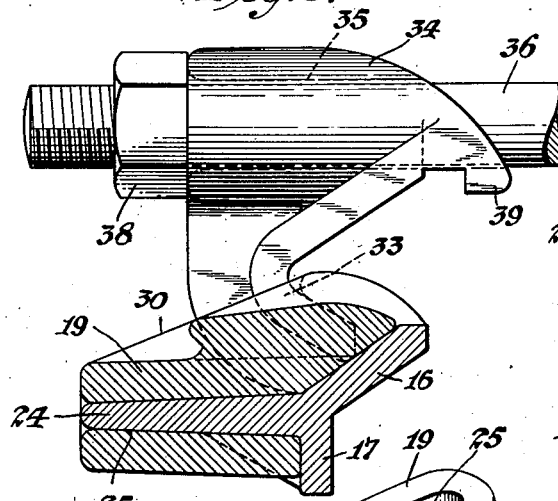
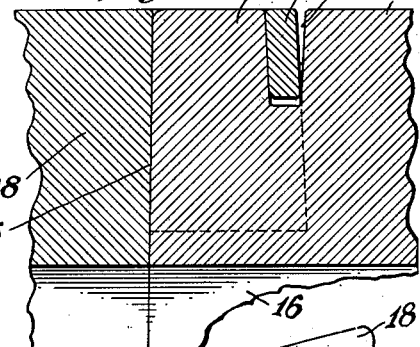
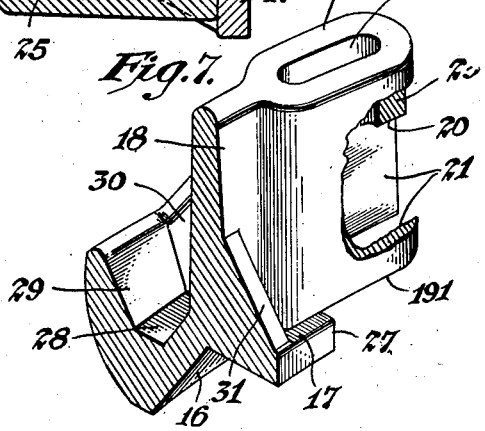
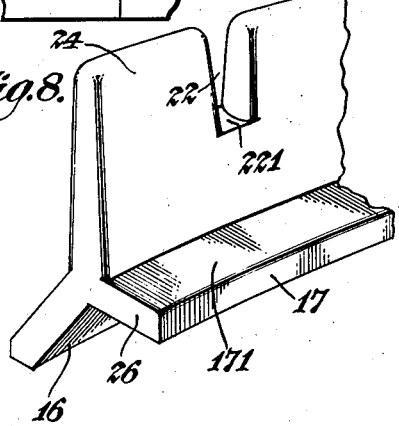
INVENTOR-
Beauford E. Gavin
BY
Clarence D Kerr
his ATTORNEY- Patented Mar. 12, 1935

1,993,927

UNITED STATES PATENT OFFICE 1,993,927

PIPE CLAMP

Beauford E. Gavin, Indianapolis, Ind., assignor, by mesne assignments, to S. R. Dresser Manufacturing Company, Bradford, Pa., a corporation of Pennsylvania Application November 27, 1931, Serial No. 577,431

16 Claims. (Cl. 285—119)

This invention relates to pipe clamps adapted to forcibly retain a gasket or similar packing member in the annular recess formed between the bell and spigot ends of large cast iron pipe sections.

An object of the invention has been to produce a more simple and at the same time a more effective construction for accomplishing the purpose specified. It is the common practice in pipe clamp constructions to employ a bull ring in cooperation with a shoulder at the bell end of one section of pipe and a clamping ring around the spigot end of the cooperating pipe section, a series of bolts being provided to draw the clamping ring toward the bull ring thereby forcing a gasket into the space between the bell and spigot ends. Heretofore it has been the general practice to connect the bolts directly with the bull ring at one end and with extensions integral with the clamping ring at the opposite end. The clamping ring is ordinarily made in several sections so that it may be applied to an existing pipe connection without separating the pipe sections. Great difficulty has been experienced in attempting to prevent the sections of the clamping ring from bending, or separating at their points of connection or rolling over, as the result of the direct action of the bolts thereon at a considerable distance from the center of resistance or reaction offered by the gasket or the like.

If rolling over occurs the clamping ring is apt to become iron-bound at one or more points with the result that an unequal or insufficient pressure will be exerted upon the gasket and a leak will be developed. In order to prevent rolling over of one or more of the sections of the older forms of clamping rings rather complicated connections have been provided between the several sections.

According to the present invention the clamping bolts are not connected directly with the clamping ring but they transmit their forces to the sections of the ring through certain intermediate elements. The arrangement of these elements is such that they transmit their forces to the clamping ring at points relatively close to the center of reaction or resistance offered by the gasket. In this way while the bolts necessarily set up their forces at points radially beyond the hub at the bell end these forces act upon the clamping ring at points much closer to the pipe axis and accordingly have much less tendency to roll the ring sections over about a pivot at the gasket.

A further feature of the invention is the provision of a simple but effective connection between the ring sections which holds them rigidly together and prevents relative turning between the sections.

Other objects and features of the invention will appear from a detailed description of an illustrative form of the same which will now be given in conjunction with the accompanying drawings in which:

Fig. 4 is an enlarged longitudinal sectional view, taken along the line 4—4 of Figure 1, through a portion of a pair of connected pipes showing the relation of the various clamping elements.

Fig. 5 is a further enlarged detail view in section along the line 5—5 of Figure 1.

Fig. 6 is an enlarged detail view in section along the line 6—6 of Figure 1, showing the connection between adjacent ring sections.

Fig. 7 is a perspective view of one end of a ring section, and

Fig. 8 is a perspective view of the opposite end of a ring section.

Figure 1:
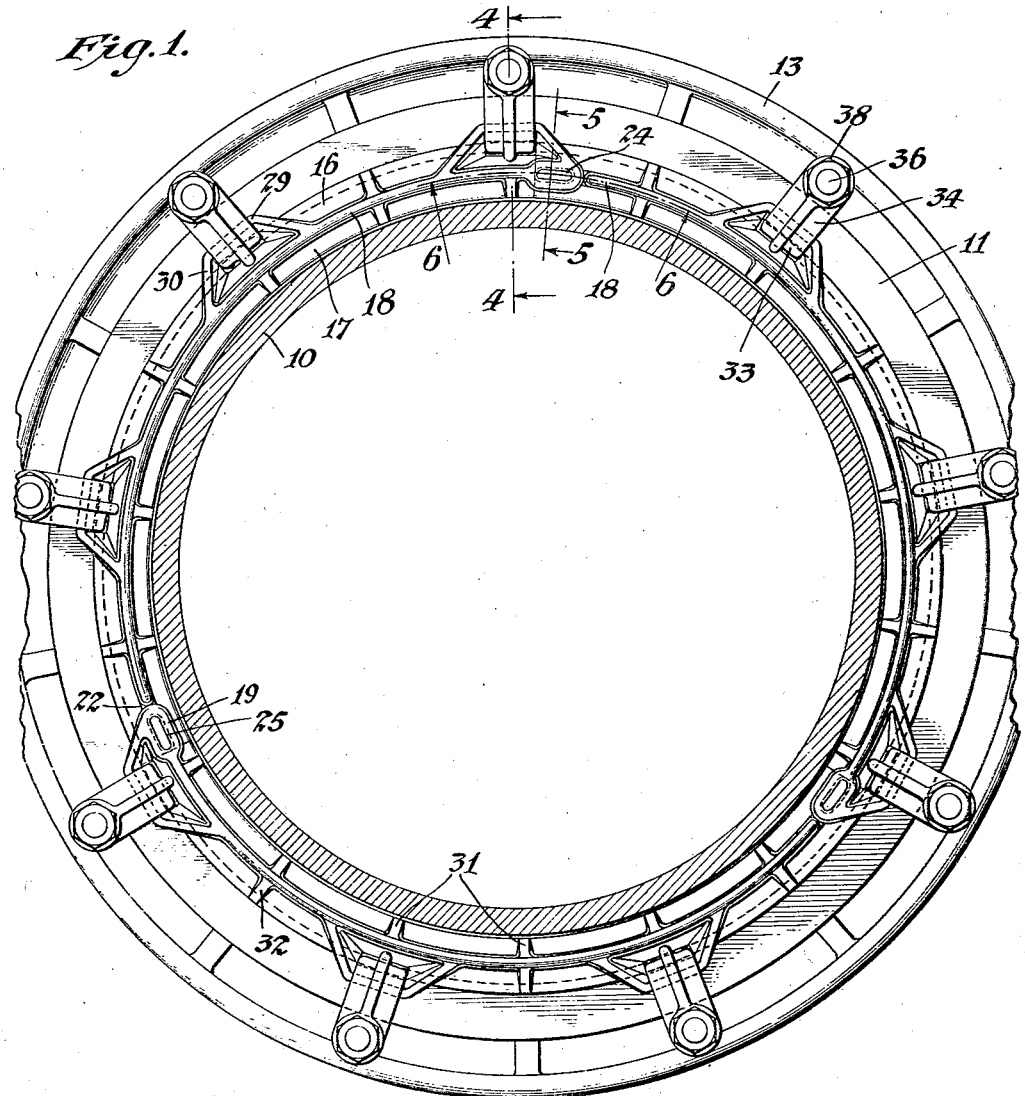
Fig. 1 is a front elevational view of the improved clamping ring and associated parts, with the spigot end of a pipe shown in section.
Figure 2:
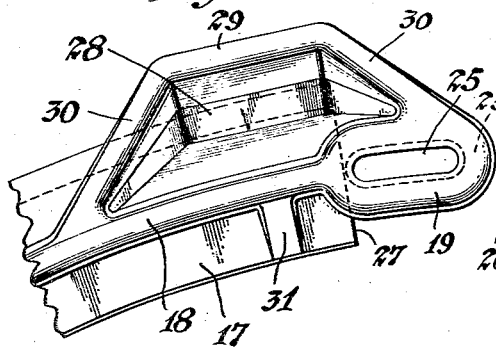
Fig. 2 is an enlarged view of one end of a clamping ring section.
Figure 3:
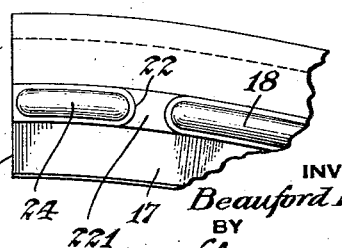
Fig. 3 is a similar view of the opposite end of an adjacent ring section.

Referring now to the drawings, it will be noted that the invention has been illustrated as applied to the particular use hereinbefore specified, namely the forcing of a gasket into the joint between the bell and spigot ends of a pair of connected pipe sections such as might be employed in a water main or an oil line or the like. It should be understood, however, that the invention is applicable with equal advantage to other uses where problems of a similar nature are presented.

As shown, a joint may be formed between the spigot end 10 of one pipe section and the bell end 11 of another pipe section, these being formed normally of cast iron. The annular space between the bell and spigot portions of the pipe sections, may be filled in the usual way with lead or similar packing substance 12. A bull ring 13, of usual construction, may be provided around the body of the bell portion 11, this ring being adapted, in a well known manner, to bear against a surface provided on an enlarged portion at the end of the bell. The bull ring may, if desired, be an integral, annular structure, although to enable its application after two pipes have been joined it is preferably formed in several sections secured together by bolts, not shown, in the usual manner. A gasket 14, formed of rubber or similar flexible sealing material, is adapted to be forced, by the clamping structure forming the basis of the present invention, against the annular opening provided between the end of the bell of one pipe and the surface at the spigot end of the adjoining pipe.

For the purpose of forcing the gasket 14 in the manner indicated, a clamping ring, designated generally by the reference character 15, is provided. This ring, similar to the bull ring, is also preferably formed of several sections, three being indicated in the drawings, so that it may be readily handled and may be applied to the spigot end of a pipe which has already been joined with the cooperating bell of another pipe. The several sections of the clamping ring are provided with flanged portions 16 and 17 arranged at an angle to each other and presenting continuous, annular surfaces adapted to cooperate with corresponding surfaces on the gasket. The arrangement of these surfaces is such that upon the application of a force to the clamping ring, in the manner to be explained, the resultant action upon the gasket will be to force it into sealing position. For this purpose the flange 17 extends substantially perpendicular to the axis of the pipe while the flange 16 extends outwardly at an angle of about 45 degrees to the axis of the pipe. Each ring section is also provided with a flange 18 concentric with the pipe for the purpose of lending rigidity to the ring and resisting any tendency to twist or bend the several sections. At one end of each section the flange 18 is divided to form a loop portion 19. This portion provides a complete or continuous, elongated loop down to a shoulder 20, indicated in Fig. 7, while from a point directly below this shoulder the loop is broken out at the end to produce a forked construction having the two sides or branches 21. This formation is adapted to inter-engage or inter-lock with a complementary construction at the opposite end of the adjacent ring section. The flange 18 at this opposite end is provided with a notch or cut-out portion 22 adapted to receive the end 23 of the loop, the arrangement being such that the shoulder or surface 20 will be brought a slight distance above a corresponding surface 221 at the bottom of the notch. A portion 24 beyond the notch 22 will then extend into an opening 25 formed by the loop 19. The assembly of two ring sections may be effected very simply by sliding the portion 24 of one section under the shoulder 20 and between the forked sides 21 of the adjacent section. The end 24 may then be forced upwardly into the opening 25 while the end 23 of the loop correspondingly enters the notch 22. At this time the end surface 26 of the one section will be brought against a shoulder 27 adjacent the looped end of the other section. At the same time the under surface 191 of the loop will engage the upper surface 171 of the flange 17 of the first section. It will be apparent that this arrangement affords a very rigid connection between the two sections and one which will resist any tendency of one ring section to turn with respect to the connected section. The rigid connection is brought about furthermore without the use of bolts or similar clamping devices.

Each ring section is provided with a series of pockets 28, one being preferably arranged adjacent the looped end of the section and others being suitably spaced along each section. These pockets are provided with a flanged portion 29 forming a hook adapted to receive a corresponding hook of a clamping element, as will be explained. Sloping flanged portions 30 joining the opposite ends of the flange 29 with portions of the flange 18 serve to complete the pockets 28. For the purpose of further stiffening the ring sections to prevent distortion, ribs 31, suitably spaced around the ring, may be provided between the flanges 17 and 18, while corresponding ribs 32 may be provided between the flanges 16 and 18.

Each of the pockets 28 is adapted to receive the hooked end 33 of a clamping element 34. The elements 34 are provided adjacent their outer ends with openings 35 adapted to receive the shanks of clamping bolts 36. These bolts may, in the usual manner, have their heads 37 in cooperation with the outer surface of the bull ring and they may be provided with nuts 38 cooperating with suitable shoulders on the clamping elements 34. In applying the clamp to a pipe, the series of nuts 38 will be taken up to substantially their limit, thus exerting a considerable force on all of the clamping elements 34. In order to prevent rotation of these elements or a pivotal action about their point of contact with the clamping ring, which would result in binding the sides of the openings 35 with the shanks of the bolts 36, an extension 39 is provided on each to cooperate with the enlarged end of the bell portion of the adjacent pipe. It will be apparent that as the nuts 38 are taken up, the projections 39 will simply slide along the outer surfaces of the enlarged bell ends and will prevent any pivotal action of the elements 34. Other means may be provided to prevent rotation of the elements 34. For instance, the upper portion of the element above the bolt could be extended along the shank of the bolt and contact with the latter as at a point above extension 39. In such case, extension 39 could be omitted. To insure transmission of the force to the gasket in the desired direction, the end of the hook 33 is provided with a pair of surfaces 40 and 41 cooperating with corresponding surfaces in the pockets 28 arranged at the same angles as the gasket engaging surfaces on the flanges 16 and 17. In this way substantially all of the force is directed toward the opening between the bell and spigot ends of the pipes and there is little or no tendency to rock or roll the ring sections over about a pivotal point on the gasket. Even if a slight rolling tendency did exist, it will be clear that it will be effectively resisted by the rigidity of the ring as a whole and it will further be apparent that there is no danger of any portion of the ring becoming iron-bound with the end of the bell 11. There is a substantial clearance between the ring and the end of the bell and there is no upward extension on the ring which is in danger of engaging the outer corner of the bell, as in the ordinary clamping ring structures. The device is simple and relatively light in construction and at the same time is more effective than prior devices for the purpose of preventing the development of leaks between the pipe sections.

While one form of the invention has been described in considerable detail, it will be understood that various modifications may be made without departing from the general principles and scope of the invention. The terms and expressions employed herein have been used as terms of description and not of limitation.

What I claim is:

1. In a pipe clamp a bull ring, a sectional clamping ring, separable clamping elements having hooked engagement with said clamping ring and adapted to tension the same, and bolts having their axes extending parallel with the axes of said rings for tying said clamping elements to said bull ring.

2. In a pipe clamp a bull ring, a clamping ring, separable clamping elements cooperating with said clamping ring, bolts tying said clamping elements to said bull ring, and means on said elements for preventing pivotal movement thereof.

3. In a pipe clamp a bull ring, a clamping ring, separable clamping elements having portions cooperating with said clamping ring, said elements having outwardly extending bolt receiving portions, bolts tying said clamping elements to said bull ring, and means compelling bodily rectilinear movement of said elements upon tightening said bolts.

4. In a pipe clamp for a bell and spigot joint a bull ring, a clamping ring all portions of which are of less radial extent than the bell, means cooperating with said ring to transmit an axial force thereto, said means being spaced from said bull ring at all points and bolts spaced from said clamping ring for tying said bull ring and said means together.

5. In a pipe clamp for a bell and spigot joint a bull ring, a clamping ring all portion of which are of less radial extent than the bell, elements cooperating with said clamping ring to transmit an axial force thereto, bolts for tying said bull ring and said elements together, and means cooperating with the bell for compelling rectilinear bodily movement of said elements upon tightening said bolts.

6. In a pipe clamp for a bell and spigot joint a bull ring, a clamping ring all portions of which are of less radial extent than the bell, elements cooperating with said clamping ring to transmit an axial force thereto, bolts for tying said bull ring and said elements together, and means on said elements cooperating with said bell to prevent pivotal movement of said elements.

7. In a pipe clamp for a bell and spigot joint a bull ring, a clamping ring all portions of which are of less radial extent than the bell, elements cooperating with said clamping ring to transmit an axial force thereto, said clamping ring and said elements having inter-engaging hooked portions, bolts for tying said bull ring and said elements together, and means compelling rectilinear movement of said elements upon tightening said bolts.

8. A clamping ring for a pipe joint which comprises a plurality of inter-connected sections, each section having an axially extending flange divided to form a looped portion at one end and notched adjacent the opposite end to provide a projection adapted to cooperate with the looped portion of the flange of the next adjacent section, the cooperating looped portion and projection of adjacent sections forming interconnecting means extending to the rear edge of the flange to substantially prevent relative twisting of the section.

9. A clamping ring for a pipe joint which comprises a plurality of inter-connected sections, each section having an axially extending flange, the flanges of adjacent sections having integral inter-fitting portions of substantial axial extent adapted to provide a rigid connection between them, said interfitting portions extending to the rear edge of said flanges.

10. A pipe clamp comprising a bull ring, a sectional clamping ring having pockets formed therein, the sections of said clamping ring having inter-locking portions forming a rigid connection between them, clamping bolts engaging said bull ring, and elements extending radially inward from said bolts and entering said pockets.

11. A pipe clamp comprising a bull ring, a sectional clamping ring, the sections of said clamping ring having inter-locking portions forming a rigid connection between them, straight clamping bolts engaging said bull ring, elements extending radially inward from said bolts for inter-locking with said clamping ring, and means compelling rectilinear bodily movement of said elements upon tightening said bolts.

12. A pipe clamp comprising a bull ring, a sectional clamping ring, means for securing the sections of said clamping ring together, straight clamping bolts engaging said bull ring, and elements extending radially inward from said bolts for inter-locking with said clamping ring and tensioning the same.

13. A pipe clamp comprising a bull ring, a sectional clamping ring, means for securing the sections of said clamping ring together, clamping bolts engaging said bull ring, and elements extending radially inward from said bolts for engaging said clamping ring, said elements having extensions cooperating with the pipe to prevent pivotal movement of the elements.

14. In a pipe joint a gasket, a clamping ring having gasket receiving shoulders formed thereon, pockets in said ring having portions at the same radial distance from the axis of the ring as said shoulder, and means interengaging with said portions of said pockets for applying a force to said ring in the direction of said gasket.

15. In a pipe joint, a sectional clamping ring extending radially from said pipe, a gasket seat on said ring of only slightly less radial extent than the major portions of said ring, means carried by an end of one of the sections of said ring adapted to receive interlocking means on an adjacent section and forming the sole connection between said sections and substantially preventing relative twisting between them, a pocket on one of said pair of ring sections, and means engageable in said pocket and extending beyond said gasket seat for receiving a clamping bolt.

16. In a pipe clamp for a bell and spigot joint, a sectional clamping ring, each section having a gasket seat formed by a substantially vertical portion and a portion inclined outwardly away from said vertical portion, said inclined portion forming the outermost radial extremity of the major part of each section, means carried by the ends of the sections for joining said sections together, a pocket in each section adjacent said means and in axial alignment with the inclined portion of said gasket seat, and individual means engageable in each of said pockets, said means being of greater radial extent than said bell and adapted to receive bolts for forcing said ring against the joint.

BEAUFORD E. GAVIN.